United States Patent [19]
Viramontes-Brown et al.

[11] Patent Number: 5,676,732
[45] Date of Patent: Oct. 14, 1997

[54] METHOD FOR PRODUCING DIRECT REDUCED IRON UTILIZING A REDUCING GAS WITH A HIGH CONTENT OF CARBON MONOXIDE

[75] Inventors: Ricardo Viramontes-Brown, Garza García; Juan Antonio Villarreal-Trevino, Guadalupe, both of Mexico

[73] Assignee: HYLSA, S.A. de C.V., San Nicholas, Mexico

[21] Appl. No.: 529,292

[22] Filed: Sep. 15, 1995

[51] Int. Cl.$^6$ .................................................. C21B 11/00
[52] U.S. Cl. ........................... 75/436; 75/446; 75/492
[58] Field of Search ........................... 75/505, 436, 492, 75/446, 498

[56] References Cited

U.S. PATENT DOCUMENTS

| | | |
|---|---|---|
| 3,909,244 | 9/1975 | Rose et al. . |
| 4,363,654 | 12/1982 | Frederick et al. . |
| 4,375,983 | 3/1983 | Celada et al. .............................. 75/505 |
| 4,578,110 | 3/1986 | Price-Falcon et al. .................... 75/492 |
| 5,238,487 | 8/1993 | Hauk et al. . |

*Primary Examiner*—Melvyn Andrews
*Attorney, Agent, or Firm*—Hutcheson & Grundy, L.L.P.

[57] ABSTRACT

A method and apparatus for producing direct reduced iron using a melter-gasifier and two reduction reactors. In the first reduction reactor, iron ore is prereduced using a reducing gas from a melter-gasifier. This prereduced iron ore is fed into the melter-gasifier to produce pig iron. A secondary reducing gas comprising hydrogen and carbon monoxide is withdrawn from the first reduction reactor and is reacted with water to produce carbon dioxide which is subsequently removed to produce a tertiary reducing gas that is used in the second reduction reactor to produce direct reduced iron from iron ore.

11 Claims, 2 Drawing Sheets

METHOD FOR PRODUCING DIRECT REDUCED IRON UTILIZING A REDUCING GAS WITH A HIGH CONTENT OF CARBON MONOXIDE

FIELD OF THE INVENTION

The present invention relates to a method and apparatus for the production of prereduced iron ore or direct reduced iron (DRI) in an ironmaking plant having two reduction reactors and a melter-gasifier system which is the reducing gas source. More particularly, the invention relates to a method and apparatus for producing DRI utilizing the reducing gas effluent from a first reduction reactor for directly reducing iron ores in a second reduction reactor. The invention is specially suited for processing iron ores that show a specific low reactivity and/or a high swelling index when reduced by carbon monoxide.

BACKGROUND OF THE INVENTION

Direct reduction plants for producing direct reduced iron, known as DRI (sponge iron) or hot briquetted iron (prereduced materials useful as feedstocks for iron and steelmaking), currently produce it by contacting a reducing gas, composed principally of hydrogen and carbon monoxide, at temperatures in the range from about 750° C. to about 1050° C., with a bed of particulate iron-containing material in the form of lumps or pellets. Examples of such processes are described in U.S. Pat. Nos. 3,749,386; 3,764,123; 3,816,101 4,336,063; 4,428,072; 4,556,417; 5,078,787; 4,046,557; 4,002,422 and 4,375,983.

It is known from U.S. Pat. No. 5,238,487 to Hauk et at. to produce direct reduced iron in a reduction reactor fed with top gas effluent from a first reaction reactor attached to a melter-gasifier. The invention of the '487 patent addresses the problems which arise when a reducing gas having a high content of carbon monoxide is heated in a heat exchanger type direct fired heater due to carburization and metal dusting of the heater pipes. More particularly, the '487 patent teaches to withdraw the oxidants in the top gas effluent from the first reactor and to utilize this modified gas in a second reduction reactor comprised in a recycle loop of the reducing gas. The recycle loop comprises the reactor; a cooler/scrubber; a $CO_2$ removal unit; a gas heater to heat the gas to a temperature between 200° C. and 500° C.; and a partial combustion chamber to heat the gas to a temperature between 750° C. to 850° C., required to carry out the reduction reactions. Alternative embodiments of the invention comprise addition of inhibitors, for example: $SO_2$, $H_2S$, $NH_3$, $(CN)_2$, $NO_2$ or $Cl_2$, individually or in combination, to the reducing gas prior to be heated in heater thus making it possible to increase the temperature of the gas in the heater and decreasing the consumption of oxygen in the partial combustion stage.

It is also known from U.S. Pat. No. 3,909,244 to Rose et al. to modify the composition of a reducing gas produced in a natural gas-stream reformer so as to obtain a higher content of hydrogen in the reducing gas. This patent teaches that reducing iron ores with a gas mainly composed of hydrogen increases the rate of reduction and increases the economy of the regeneration of the recirculating gases. There is no teaching or suggestion in this patent as to the utilization of a reducing gas effluent from a first reduction reactor or solving the problems posed by iron ores having a high swelling index when reduced with carbon monoxide.

U.S. Pat. No. 4,363,654 to Frederick et al. is directed to a process for producing a reducing gas for a direct reduction or blast furnace which comprises partially oxidizing oil and/or coal in the presence of air to produce a gas stream containing hydrogen and nitrogen together with other gases, treating the gas stream to remove essentially all gases other than hydrogen and utilizing said hydrogen for reducing iron ores. This patent however does not teach or suggest to have a combination of a melter-gasifier and a first reduction reactor and a shifter for modifying the reducing gas composition to be utilized in a second reduction reactor. No suggestion is made in this patent about the problems encountered in reducing iron ores with a high swelling index when reacted with carbon monoxide.

SUMMARY OF THE INVENTION

It is an object of the present invention to provide a method and an apparatus for utilizing in a second reduction reactor the excess exhausted gas from a first reduction reactor fed with a reducing gas produced in a melter-gasifier without the problems of swelling presented by iron ores when reduced by carbon monoxide, thus increasing the capabilities of the reduction system to process a wider range of iron ores.

It is another object of the invention to provide a method and apparatus for utilizing in a second reduction reactor a reducing gas having a high carbon monoxide content as a source of reductants without the problems of carburization of heating equipment and with an increased productivity of the second reactor.

The present invention is a method for producing DRI which comprises providing a source of reducing gas having a high content of carbon monoxide, of about 30% to about 40%. The reducing gas flows through a first reduction reactor wherein iron ore is prereduced and the prereduced iron ore is fed to the source of reducing gas for melting and removal as pig iron. Top gas effluent from the first reduction reactor is cooled and cleaned by adding water to the relatively cool and clean gas stream and feeding it to a catalyst-laden vessel to carry out the reaction of carbon monoxide with the water to produce hydrogen and carbon dioxide. Carbon dioxide is removed from the reducing gas thus producing a reducing gas stream with a hydrogen content above about 65% and utilizing the reducing gas in a second reduction reactor.

The invention also comprises an apparatus for producing DRI which has a melter-gasifier, a first reduction reactor, conduit means for supplying reducing gas produced in the melter-gasifier to the first reactor to prereduce iron ore materials which are melted in the melter-gasifier; a catalyst-laden vessel and means for withdrawing top reducing gas from the first reaction reactor and for introducing the top gas to the vessel; a second reduction reactor and means to feed the reducing gas to the second reactor to produce DRI therein.

DETAILED DESCRIPTION OF PREFERRED EMBODIMENTS

Figure 1:
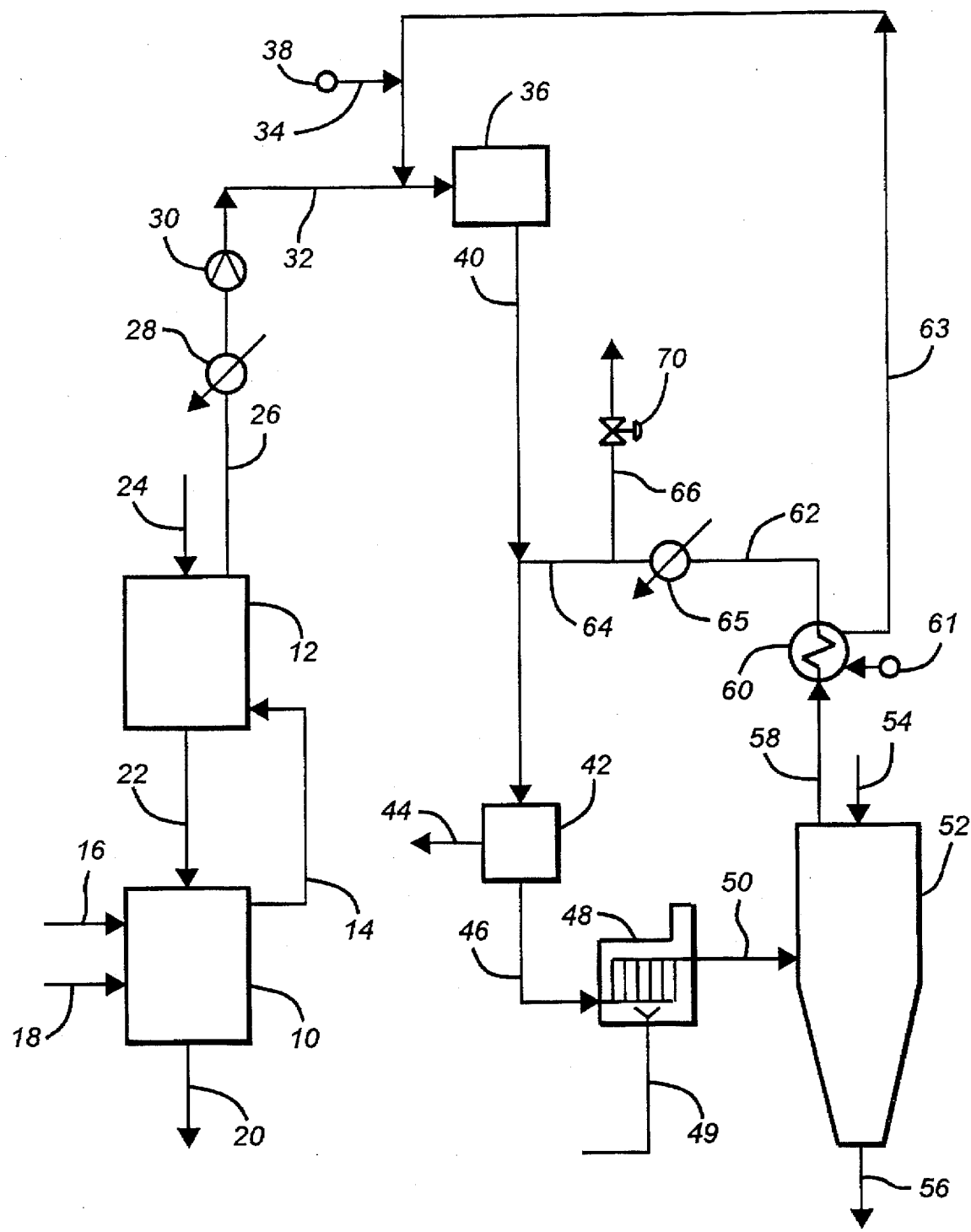
FIG. 1 shows schematically an embodiment of the present invention, illustrating a diagram of the process and apparatus for producing DRI according to the invention.

The invention is herein described as applied to direct reduction systems having moving bed reactors, but it will be understood that it can be adapted to plants having fixed beds or fluidized bed reactors. With reference to FIG. 1, in a melter-gasifier 10, prereduced iron ore 22 from a first reduction reactor 12 is melted by the reaction of coal 16 and oxygen 18 which produces heat for melting the iron ore and also reducing gas 14 comprising hydrogen and carbon monoxide. The melted iron is removed from the melter-gasifier as pig iron 20. The reducing gas 14 is fed to the first reduction reactor 12 to reduce iron ore 24 introduced at the upper part of reactor 12 and top gas 26, which comprises reductants like hydrogen and carbon monoxide, as well as oxidants like water and carbon dioxide resulting from the reduction reactions of iron oxides. A portion of the top gas 26 exiting the reactor 12 at a temperature in the range from about 350° C. to about 500° C. is cooled down to a lower temperature in cooler 28 so that it can be compressed by a suitable compressor 30 and is then passed through a vessel 36 (shifter) with a catalyst, usually an iron-based catalyst, where the shift reaction is carried out, by reaction of carbon monoxide with water to produce hydrogen and carbon dioxide. For this purpose, water in the form of steam is added through pipe 34 from a suitable source 38. The steam can also be generated from other high temperature streams of the plant, for example, from the effluent gas 58 withdrawn as described herein below. The resulting gas 40 is combined with recycled gas 64 exiting from the second reduction reactor 52 and passed through a carbon dioxide removal unit 42 where carbon dioxide 44 is separated from the other components of the reducing gas stream by suitable means, such as liquid absorber solutions, e.g., hot carbonate solutions, amines solutions, pressure swing absorption units, or preferably volume swing absorption units. After removal of $CO_2$, the gas stream 46 has a volume ratio of hydrogen to carbon monoxide ranging from about 2:1 to about 20:1. It is heated from ambient temperature to a temperature suitable for reduction of iron ores, namely in the range from about 750° C. to about 1050° C., preferably about 950° C., in a gas heater 48 fired by combustion of a suitable fuel 49. The fuel 49 can be derived from the reciter-gasifier or from other sources as, for example, a portion of stream 64 or from outside the plant. The stream of high temperature reducing gas 50 is contacted with iron ore 54 introduced at the upper part of reactor 52 and reduced to DRI exiting line 56. Exhausted reducing gas 58 is recycled to reactor 52 so that almost full utilization of the reducing gas is achieved. This can be done by regenerating the reducing power of the gas by withdrawing the water formed in the reactor from the reduction reactions. To this end, the hot gas stream effluent from reactor 52 passes through a heat exchanger 60 where steam 61 is produced and is utilized as reactant in the shifter 36. If necessary, steam 38 from another suitable source can be provided to shifter 36. A portion of the exhausted gas stream 64 is purged from the gas loop by means of control valve 70 in order to remove inert components in the reducing gas which may be accumulated and also for pressure control of the system.

Figure 2:
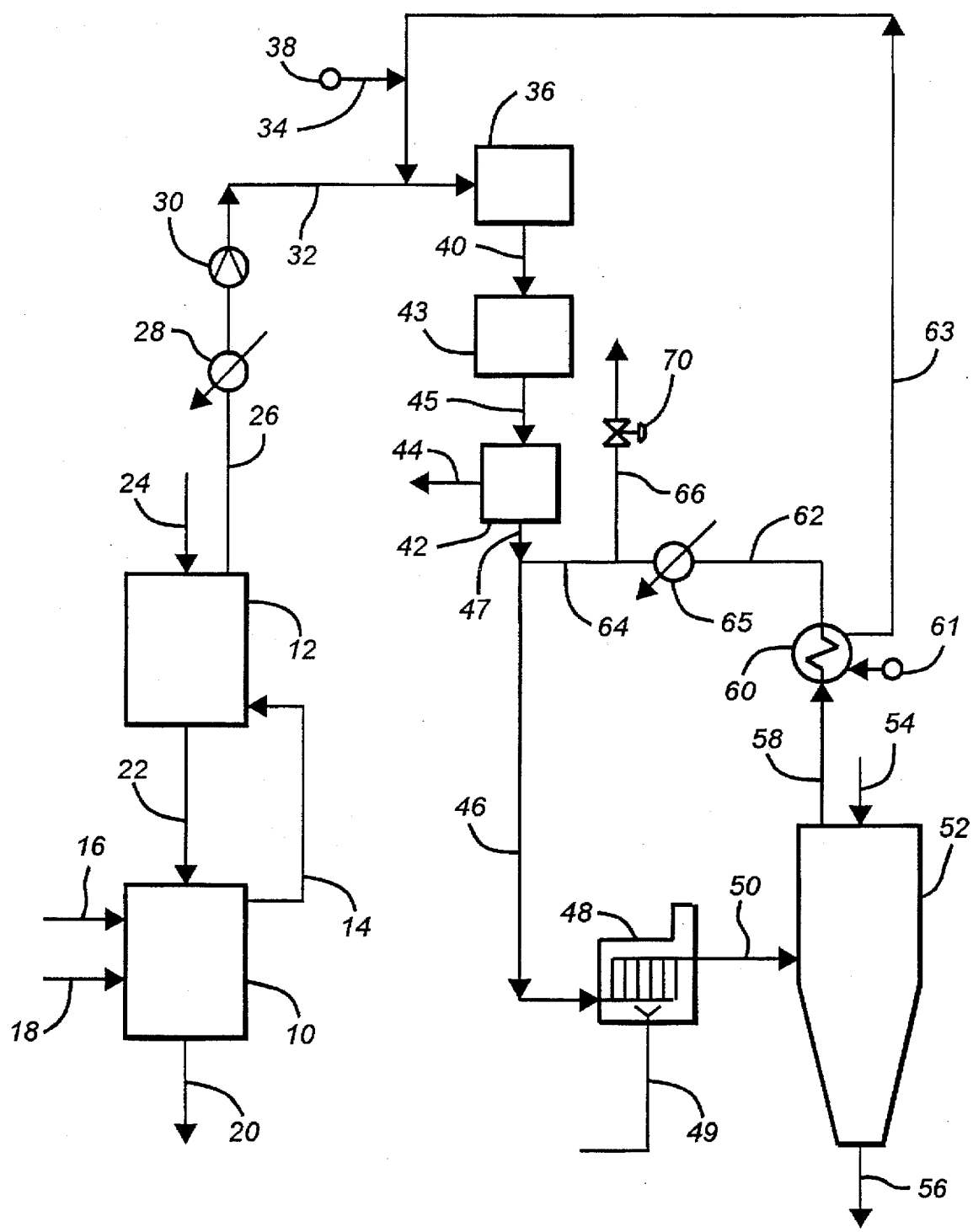
FIG. 2 shows another embodiment of the invention where two shifters are used for modifying the composition of the reducing gas to still lower levels of carbon monoxide and where the $CO_2$ removal unit is located outside of the gas loop of the second reduction reactor.

Referring to FIG. 2, where like numbers refer to like items, a second embodiment of the invention is disclosed where the gas effluent from a first shifter 36 is passed through a second shifter 43 in order to further decrease the carbon monoxide content of the reducing gas. In this embodiment, the reducing gas enters shifter 36 at a temperature between about 300° C. and about 330° C. and with a hydrogen content of about 25% to about 30% and a carbon monoxide content of about 40% to about 50% by volume. The gas is mixed with about 1.2 to 1.3 volumes of steam per volume of reducing gas and is caused to react in contact with an iron based catalyst exiting the shifter 36 at about 470° C. to about 490° C. Heat from gas streams 40 and 45 can be recuperated by means of suitable heat exchangers to produce steam needed for the shift reaction or other uses in the plant (which are not shown for simplicity of the drawing). The gas 40 passes through a "low temperature" shifter 43 provided with a copper based catalyst, and the gas 45 exits at a temperature of about 360° C. to about 390° C. Carbon dioxide 44 is removed from the gas stream 45 after sensible heat has been utilized in producing steam or otherwise, and the resulting reducing gas 47 has an approximate composition as follows:

| | |
|---|---|
| Hydrogen | >80% |
| Carbon Monoxide | 4%–6% |
| Carbon Dioxide | 1%–2% |
| Methane | 1%–3% |
| Nitrogen | 3%–5% |
| Water | Balance |

This reducing gas 47 is then fed to the reducing gas loop of reactor 52. The high content of hydrogen and low content of carbon monoxide of the reducing gas 47 makes it possible to place the $CO_2$ removal unit outside of the loop processing a gas stream with higher concentration of $CO_2$, making the unit more efficient and decreasing the energy needed for the removal of $CO_2$. Also, the regeneration of the recycled gas 62 effluent from reactor 52 is simpler since only water must be eliminated by condensation in cooler 65. Elimination of carbon dioxide produced in reactor 52 is done by means of purge 66 which also controls accumulated nitrogen and other inerts.

An example of the claimed process as calculated and simulated in a demonstration plant is as follows: A reducing gas obtained from a first reduction reactor without recycle fed with reducing gas produced in a melter-gasifier from coal and oxygen had a hydrogen content from about 15% to about 25% by volume and a carbon monoxide content of about 40% to about 50% by volume, the rest being carbon dioxide, nitrogen, methane and water. The gas was then passed through a shifter where it reacted with water producing a gas with a hydrogen content of about 25% to about 30% and a carbon monoxide content from about 5% to about 10%. After being cooled down to ambient temperature and after water has been separated from the gas by condensation, the reducing gas has a hydrogen content of about 35% to about 40%, and a carbon monoxide content between about 6% to about 8%. The gas was then combined with recycled gas from the reduction reactor, and the composition of hydrogen and carbon monoxide in the resulting combined stream is about 45% to about 50% hydrogen and about 10% to about 12% carbon monoxide, as well as about 30% to about 35% carbon dioxide. After passing the gas through a $CO_2$ removal unit, the reducing gas suitable for being fed to the second reduction reactor with a composition of about 65% to about 75% hydrogen and about 15% to about 20% carbon monoxide.

If desired, DRI may be discharged from said second reduction reactor at high temperature, for example, above 500° C., or, if so preferred, it may be discharged at a temperature below 100° C., by cooling said DRI in the lower portion of the second reactor through the circulation of a stream of cooling gas in contact with the DRI.

From the foregoing description, it should be apparent that the present invention provides a process capable of achieving the several objects of the invention set forth above. Thus, it provides a novel and exceptionally efficient method of increasing the production capacity of a raw ironmaking system based on coal and oxygen diversifying its production to solid DRI production utilizing in this way the excess reducing gas produced in melter-gasifiers. It is, of course, to be understood that the foregoing description is intended to be illustrative only and that numerous changes can be made in the structure of the system described and its operating conditions without departing from the spirit of the invention as defined in the appended claims, for example, the invention can be applicable to any process wherein the exhausted gas has a high carbon monoxide content and the iron ore materials are sensitive with respect to swelling when reacted with carbon monoxide.

In this specification and in the accompanying drawings, some preferred embodiments of the invention are shown and described and various alternatives and modifications thereof have been suggested; but it is to be understood that these are not intended to be exhaustive and that many other changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

What is claimed is:

1. A method for producing direct reduced iron which comprises:

producing a primary reducing gas and melting prereduced iron ore in a melter-gasifier;

passing the primary reducing gas from the melter-gasifier into a first reduction reactor where iron ore material is prereduced;

transferring the prereduced iron ore from the first reduction reactor to the melter-gasifier where the prereduced iron are is melted;

removing the melted prereduced iron ore from the melter-gasifier as pig iron;

withdrawing from said first reduction reactor a secondary reducing gas of a composition including about 15% to about 30% by volume of hydrogen and at least about 40% by volume of carbon monoxide;

adding water to the composition of the secondary reducing gas;

passing the secondary reducing gas and water through a shifter to react the carbon monoxide with water to form carbon dioxide, whereby the volume of hydrogen in the secondary reducing gas increases and the volume of carbon monoxide decreases;

removing carbon dioxide from said secondary reducing gas in a carbon dioxide removal unit whereby a tertiary reducing gas is formed;

feeding iron ore and the tertiary reducing gas to a second reduction reactor to produce direct reduced iron; and removing the direct reduced iron as a product.

2. A method for producing direct reduced iron according to claim 1, further comprising combining the secondary reducing gas with top gas withdrawn from the second reduction reactor and feeding the combined gas stream to the carbon dioxide removal unit.

3. A method for producing direct reduced iron according to claim 1 where the combined gas stream is heated in a direct fired heater to a temperature between about 750° to about 1050° C.

4. A method for producing direct reduced iron according to claim 3 where the combined gas stream is heated in a direct fired heater to a temperature between about 900° to about 950° C.

5. A method for producing direct reduced iron according to claim 1 wherein the carbon dioxide removal unit is a volume swing adsorber.

6. A method for producing direct reduced iron according to claim 1 wherein the carbon dioxide removal unit is a pressure swing adsorber.

7. A method for producing direct reduced iron according to claim 1 wherein the carbon dioxide removal unit is a liquid solution of amines.

8. A method for producing direct reduced iron according to claim 1 wherein both the first and second reduction reactors are moving beds.

9. A method for producing direct reduced iron according to claim 1 wherein the direct reduced iron is discharged from the second reduction reactor at a temperature above about 500° C.

10. A method for producing direct reduced iron according to claim 9 further comprising hot briquetting direct reduced iron from second reduction reactor.

11. A method for producing direct reduced iron according to claim 1 further comprising cooling the direct reduced iron in the lower portion of the second reactor by circulating a stream of cooling gas in contact with the direct reduced iron and discharging the direct reduced iron from the second reduction reactor at a temperature below about 100° C.

* * * * *